June 3, 1952 J. BERCHAK 2,599,219
FISHING ROD AND REEL
Filed March 1, 1948 2 SHEETS—SHEET 1
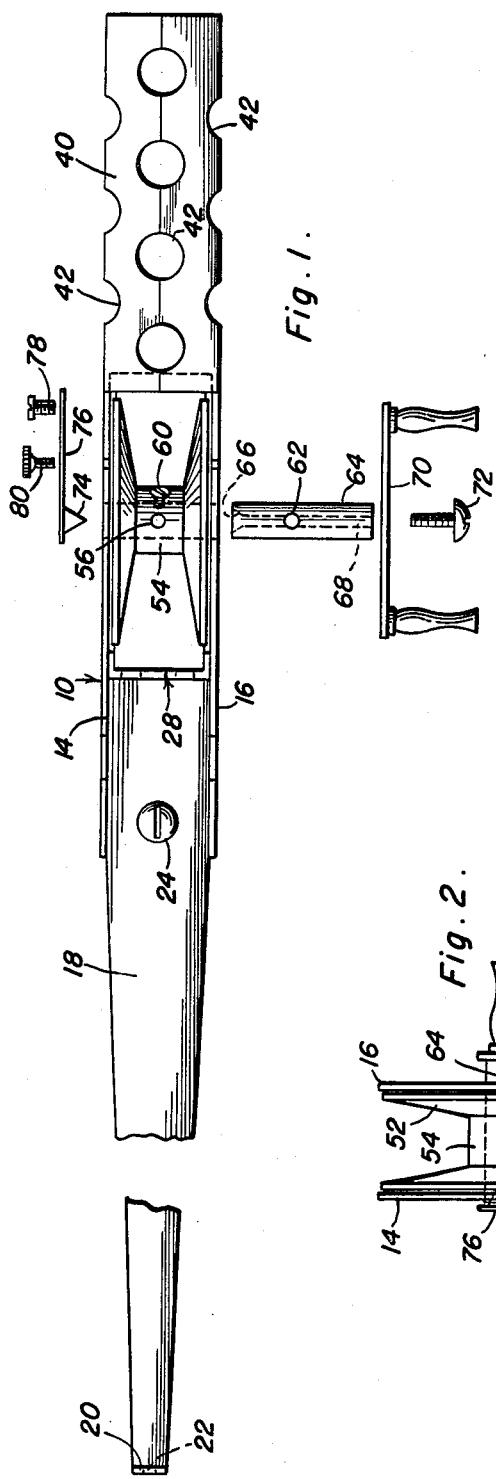
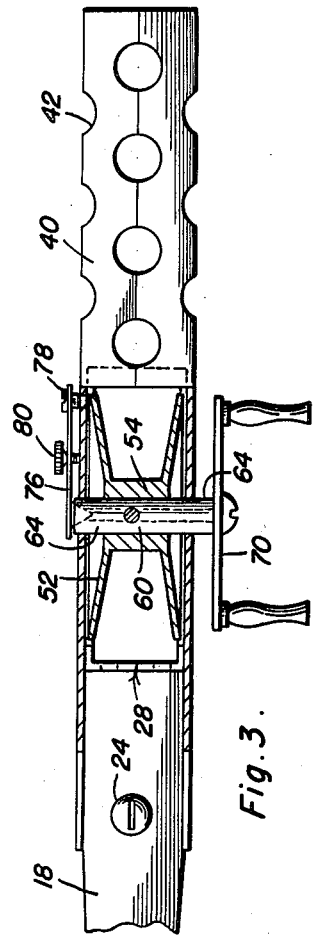
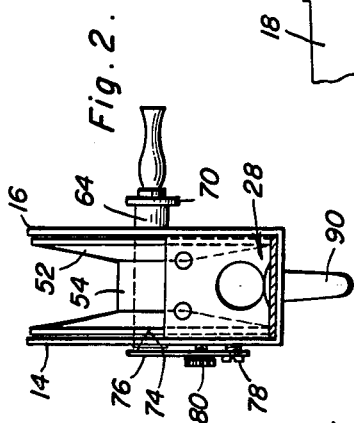
Jack Berchak
INVENTOR.
BY
*Clarence A. O'Brien*
*and Harvey B. Jacobson*
Attorneys

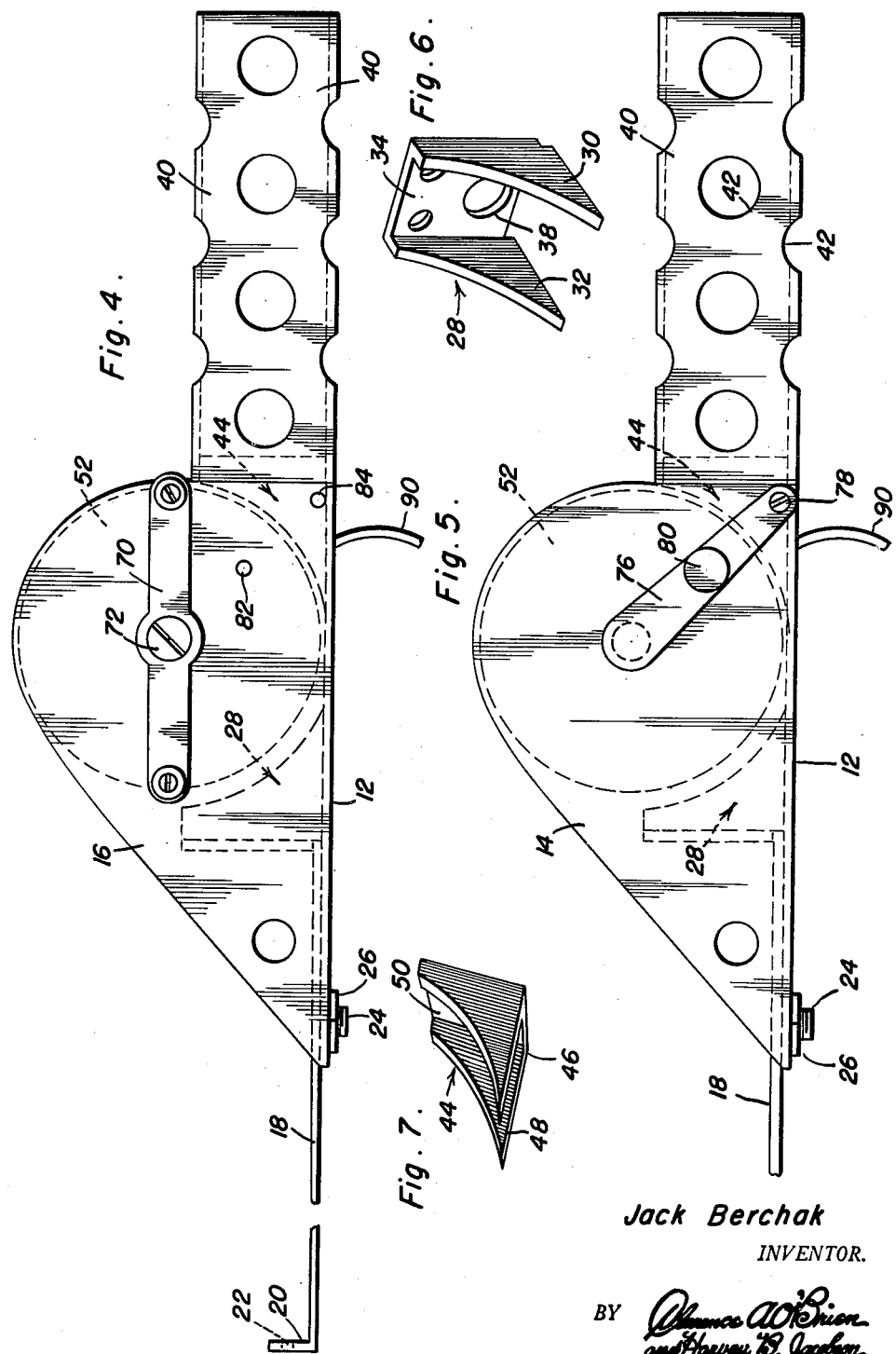

Patented June 3, 1952

2,599,219

UNITED STATES PATENT OFFICE 2,599,219

FISHING ROD AND REEL

Jack Berchak, Elmira, N. Y.

Application March 1, 1948, Serial No. 12,359

5 Claims. (Cl. 43—20)

This invention appertains to novel and useful improvements in devices for use as fishing appurtenances.

An object of this invention is to reduce the cost of fishing rods and reels by simplicity of structure.

Another object of this invention is to provide a combined fishing rod and reel, whereby the actuation mechanism and particularly the handle thereof is provided in such a manner as to be interchangeable for use by a left-handed or right-handed individual.

Another object of this invention is to detachably support a rod on a housing, which housing is utilized for the purpose of journaling a reel and also for the purpose of providing a handle.

Another object of this invention is to provide a simplified brake mechanism for use in association with the present invention, which mechanism is interchangeable to either the right or left side of the supporting members therefor, whereby it may be used effectively by either right handed or left handed persons.

Another object of this invention is to provide a metallic structure throughout, whereby the article of manufacture may be made from one type of stock, substantially, thereby obviating the necessity of dealing with various divergent sources of materials.

Ancillary objects and features of novelty will become apparent to those skilled in the art, in following the description of the preferred form of the invention, illustrated in the accompanying drawings, wherein:

Figure 1 is an exploded plan view of one form of the invention;

Figure 2 is an end view of the invention shown in Figure 1, showing the same in assembled form;

Figure 3 is a fragmentary sectional view illustrating details of construction of the invention;

Figure 4 is an elevational side view of the invention shown in Figure 2;

Figure 5 is an elevational side view of the invention shown in Figure 4, showing various components in a reverse position for operation by right handed persons;

Figure 6 is a perspective view of a bearing block or bracket utilized in association with the present invention; and Figure 7 is a perspective view of a second bearing block forming a portion of the invention.

This invention has been developed to provide a device for economy of manufacture of an improved fishing appurtenance. A combined fishing rod and reel is supplied of substantially only one material, preferably metallic, and may be manufactured by various relatively inexpensive machine operations including stamping, bending and the like.

It is further within the purview of the present invention to supply a simplified device whereby either left handed or right handed individuals may utilize the same effectively by simple manipulation and rearrangement of elements.

As is seen best in Figure 1, a housing generally indicated at 10 is provided of a bottom portion 12 having substantially right angularly extending sides 14 and 16, respectively.

Detachably secured between the said sides 14 and 16 is a rod 18 which may be either substantially flat and tapering at the end, or if desired, may be creased or otherwise treated for rigidity in accordance with the design desired. It is further within the purview and contemplation of the present invention to provide either a circular or non-circular rod in lieu of the rod 18 as an alternate construction.

One terminal portion of the said rod 18 is supplied with a guide 20 having an aperture 22 therein, which aperture is obviously utilized for the purpose of entraining a fishing line therethrough. The opposite end of the said rod 18 may be maintained in place through the utility of a conventional screw 24 having the usual appurtenance at 26 associated therewith. The extreme end of the rod 18 is maintained beneath the bracket 28 (Figure 6) which is secured by standard means to the bottom 12.

This bracket 28 includes a pair of plates 30 and 32, respectively, which are spaced by means of an apertured tying member 34 integral with the side plates 30 and 32. It will be noted that the lower portion of the tie plate 34 is cut away in order to accommodate the extreme terminal of the said rod 18 thereunder. The aperture 38 therein is also utilized for the purpose of a guide for a conventional fishing line.

The handle portion 40 may be formed integral with the said housing, and is provided with a plurality of apertures 42 therein for additional strength and rigidity as well as for forming an efficacious grip. Of course, where it is found desirable, the finished product may be supplied with a covering over the handle 40, this being a matter of choice.

A second bracket 44 is secured by standard means to the bottom 12 and includes a pair of side plates 46 and 48, respectively, which are connected by a tie plate 50. The tie plate is integral with the side plates 46 and 48, thereby forming a bracket. It will be noted at this point that the side plates 46, 48 and 30, 32 have arcuate edges which taper toward each other when positioned between the sides 14 and 16, respectively, of the said housing. It is between these arcuate edges that a reel 52 is positioned.

The said reel is of substantially conventional description and preferably includes a substantial hub 54 having an aperture 56 therein for accommodation of a set screw 60. This set screw is adapted to match with an aperture 62 which is formed in a shaft 64. Of course, the aperture 62 is internally threaded for detachably seating the set screw 60.

Viewing Figure 1, it will be seen that the said shaft 64 is supplied with a substantially frusto-conical recess or aperture 66 at one end and a threaded bore 68 at the opposite end. The said threaded bore is adapted to accommodate a conventional handle 70 through the medium of a conventional screw 72. The said substantially frusto-conical aperture 66 is cooperative with a conical clutch element 74 in order to form a friction brake.

It will be noted that the substantially conical clutch element 74 is attached to an arm 76 which may be resilient, if found desirable. This arm has a pair of apertures therein, one of which accommodates an anchoring screw 78, while the other accommodates a set screw 80. The said set screw is adapted to be received in a threaded aperture 82, while the said anchoring screw 78 is adapted to be received in a spaced aperture 84. These apertures are of course formed in the sides 16 and 14, whereby the handle 70 and arm 76 with its various appurtenances contiguous thereto may be reversed in the housing 10 for left handed or right handed operation of the invention. Also, it is readily appreciated that upon manipulation of the set screw 80, the conical clutch element 74 will be selectively frictionally pressed within the aperture 66 or released therefrom.

In the desired location on the bottom 12 of the said housing, a finger rest element 90 may be stamped from the stock thereof or attached thereto, as desired. However, it will be noted that it is perferable to simply stamp the finger mechanism from the stock of the housing, thereby minimizing the cost of production.

From the foregoing, a clear understanding of the operation of the invention is deemed readily apparent. However, it is apparent that certain variations may be made without departing from the spirit thereof. Accordingly, limitation is sought only in accordance with the scope of the following claims.

Having described the invention, what is claimed as new is:

1. A fishing rod and reel comprising a housing which includes a bottom with upstanding flat sides, a handle projecting rearwardly from said sides, a reel disposed between said sides and having means for operating said reel, a flat rod disposed between said sides and projecting from the end thereof remote from said handle, a bracket disposed between said sides and having one end of said rod releasably accommodated thereby, and means securing said rod to the bottom of said housing.

2. A fishing rod and reel comprising a housing which includes a bottom with upstanding flat sides, a handle projecting rearwardly from said sides, a reel disposed between said sides and having means for operating said reel, a flat rod disposed between said sides and projecting from the end thereof remote from said handle, a bracket disposed between said sides and having one end of said rod releasably accommodated thereby, and means securing said rod to the bottom of said housing, a brake operatively connected with said reel, a second bracket mounted between said sides and remote from said first mentioned bracket, and means fastening said brake to one of said sides adjacent said second bracket.

3. In a fishing rod a housing constituting a means to support a reel, said housing including a bottom with upstanding flat sides rising from opposite edges thereof, a handle projecting rearwardly from said sides and fixed to said bottom, said sides having aligned apertures therein to accommodate a reel shaft, a rod extending forwardly of said housing and including a flat rear end overlying said bottom wall and disposed between said sides, means securing the flat rear end of said rod to and against said bottom of said housing.

4. In a fishing rod a housing constituting a means to support a reel, said housing including a bottom with upstanding flat sides rising from opposite edges thereof, a handle projecting rearwardly from said sides and fixed to said bottom, said sides having aligned apertures therein to accommodate a reel shaft, a rod extending forwardly of said housing and including a flat rear end, means securing the rear end of said rod to and against said bottom of said housing and between said sides, a bracket disposed between said sides and having the inner end of said rod disposed under a part thereof.

5. A fishing rod comprising an elongated channel member having forward and rear ends and side walls extending throughout its length and joined by a bottom wall, said side walls being separated intermediate their ends to form forward and rear portions, the rear portions of said side walls being bent inwardly toward each other at their upper portions to form a hand grip, a bracket secured between the forward portions of said side walls, a rod having a flat rear end resting against the bottom wall at the forward end thereof and between the forward ends of said side walls, said bracket having a notch accommodating the rear end of said rod, and a fastener detachably securing the rear end of said rod against said bottom wall and retaining said rear end of said rod in said notch.

JACK BERCHAK.

REFERENCES CITED

The following references are of record in the file of this patent:

UNITED STATES PATENTS

| Number | Name | Date |
|---|---|---|
| 56,937 | Hartill | Aug. 7, 1866 |
| 369,622 | Titus | Sept. 6, 1887 |
| 384,672 | Boardman | June 19, 1888 |
| 465,579 | Knudsen | Dec. 22, 1891 |
| 581,291 | Kraft | Apr. 27, 1897 |
| 703,223 | Atwood | June 24, 1902 |
| 1,941,739 | Crawford | Jan. 2, 1934 |
| 2,225,719 | Shotton | Dec. 24, 1940 |
| 2,261,629 | Murphy | Nov. 4, 1941 |
| 2,409,154 | Schafer | Oct. 8, 1946 |